(12) United States Patent
Kunii et al.

(10) Patent No.: US 7,967,057 B2
(45) Date of Patent: Jun. 28, 2011

(54) INDUCTION MELTING APPARATUS EMPLOYING HALIDE TYPE CRUCIBLE, PROCESS FOR PRODUCING THE CRUCIBLE, METHOD OF INDUCTION MELTING, AND PROCESS FOR PRODUCING INGOT OF ULTRAHIGH-PURITY FE-, NI-, OR CO-BASED ALLOY MATERIAL

(75) Inventors: Kazutaka Kunii, Kobe (JP); Tatsuhiko Kusamichi, Kobe (JP); Jumpei Nakayama, Kobe (JP); Kiyoshi Kiuchi, Tokai (JP)

(73) Assignee: Kobe Steel, Ltd., Kobe-shi (JP)

( * ) Notice: Subject to any disclaimer, the term of this patent is extended or adjusted under 35 U.S.C. 154(b) by 359 days.

(21) Appl. No.: 12/095,319

(22) PCT Filed: Nov. 21, 2006

(86) PCT No.: PCT/JP2006/323238
§ 371 (c)(1),
(2), (4) Date: May 29, 2008

(87) PCT Pub. No.: WO2007/063748
PCT Pub. Date: Jun. 7, 2007

(65) Prior Publication Data
US 2009/0038772 A1    Feb. 12, 2009

(30) Foreign Application Priority Data

Nov. 30, 2005  (JP) ................. 2005-346437
Nov. 30, 2005  (JP) ................. 2005-346438

(51) Int. Cl.
*B22D 27/02*   (2006.01)
*C22B 9/10*    (2006.01)
*C22B 9/16*    (2006.01)

(52) U.S. Cl. ........ 164/493; 164/494; 164/497; 164/512; 164/513; 75/10.15; 75/10.18

(58) Field of Classification Search .................. 164/493, 164/494, 497, 469, 470, 471, 506, 507, 512, 164/513; 75/10.15, 10.18
See application file for complete search history.

(56) References Cited

U.S. PATENT DOCUMENTS
3,775,091 A    11/1973    Clites et al.

FOREIGN PATENT DOCUMENTS
FR    1.140.849    8/1957
JP    5 322451     12/1993
(Continued)

*Primary Examiner* — Kevin P Kerns
(74) *Attorney, Agent, or Firm* — Oblon, Spivak, McClelland, Maier & Neustadt, L.L.P.

(57) ABSTRACT

There is described a method for producing ultrahigh-purity Fe-base, Ni-base, and Co-base alloying materials to achieve impurity levels of (C+O+N+S+P)<100 ppm, and Ca<10 ppm, in the form of a large ingot, using a refining flux while forcibly cooling the crucible. A refining flux selected from the group consisting of metal elements of the Groups IA, IIA, and IIIA of the Periodic Table, oxides thereof, halides thereof, and mixtures thereof, is added to the molten metal during primary melting and the molten metal is held in contact with the refining flux for at least 5 minutes before tapping. Thereafter, the molten metal is caused to undergo solidification inside a mold, thereby producing a primary ingot. Subsequently, secondary melting is executed by an electron-beam melting method whereby while the primary ingot is sequentially melted in a water-cooled copper mold at a low pressure, the molten metal as-solidified state is pulled out from an outlet side of the water-cooled copper mold, thereby forming an ingot product.

8 Claims, 1 Drawing Sheet

FOREIGN PATENT DOCUMENTS

| | | |
|---|---|---|
| JP | 6 58672 | 3/1994 |
| JP | 11 246910 | 9/1999 |
| JP | 11 246919 | 9/1999 |
| JP | 11 310833 | 11/1999 |
| JP | 11-310833 A * | 11/1999 |
| JP | 2000 248310 | 9/2000 |
| JP | 2001 279340 | 10/2001 |
| JP | 2001-279340 A * | 10/2001 |
| JP | 2002 69589 | 3/2002 |
| JP | 2002 122386 | 4/2002 |
| JP | 2003 55744 | 2/2003 |
| JP | 2003 227687 | 8/2003 |

* cited by examiner

INDUCTION MELTING APPARATUS EMPLOYING HALIDE TYPE CRUCIBLE, PROCESS FOR PRODUCING THE CRUCIBLE, METHOD OF INDUCTION MELTING, AND PROCESS FOR PRODUCING INGOT OF ULTRAHIGH-PURITY FE-, NI-, OR CO-BASED ALLOY MATERIAL

TECHNICAL FIELD

The invention relates to an induction-melting apparatus for use in refining a high-grade stainless steel, superalloy, and so forth, of which high-purity, and high cleanliness are required, by melting, and a method for induction-melting of alloying materials, using the induction-melting apparatus.

BACKGROUND ART

For a common induction-melting apparatus, use is made of a relatively small-sized apparatus of a type using a crucible formed of refractories made of sintered magnesia or alumina, provided inside an induction coil, or a large-sized apparatus comprising a crucible layer formed by sintering the surface layer of powdery refractories. With any type of those apparatuses, it is a common practice to use the same after filling refractory powders in-between the induction coil, and the crucible layer as sintered in order to protect the crucible from high temperature.

For induction-melting of material having a high melting point, such as iron-base alloy, nickel-base alloy, or cobalt-base alloy, a crucible made of refractories excellent in refractoriness at high temperature is required. Further in the case of using a melting apparatus of a water-cooled copper coil type, there is no denying a possibility that a crucible undergoes melt-damage, thereby directly affecting the copper coil.

Further, upon melting for refining an alloying material of high-purity, and high cleanliness, if a large amount of a halide-base refining flux is used for the purpose of desulfurization, and dephosphorization in a molten metal, there arises a risk that the flux in a molten state at a high temperature will cause the melt-damage of refractories making up a crucible, such as silica, alumna, magnesia, or calcium oxide, and so forth.

Accordingly, if a cold-crucible induction-melting method using a crucible made up of water-cooled type copper segments is applied, this will cause temperature of the crucible during a melting operation to become as low as around 200° C., so that it is possible to prevent consumption of the refractories due to the melt-damage thereof, caused by the refining flux in the molten state at the high temperature, as described above. Therefore, even in the case of using the halide-base refining flux, a permissible range of composition thereof will become greater.

In each of the following Patent Documents 1 to 3, there is disclosed an excellent method for refining stainless steel through desulfurization, and dephosphorization, using such a system as described in the foregoing, however, even with this method, another problem caused by the water-cooled copper crucible is encountered. More specifically, if an operation is carried out in the copper crucible cooled down to on the order of 200° C., in a state of a molten metal and a refining flux being in direct contact therewith, a temperature of the refining flux becomes excessively low, thereby impairing refining effects. Or an amount of heat transfer from a molten pool to the copper crucible becomes excessively large, leading to deterioration in power efficiency. In order to cope with such problems as described, techniques devised so as to enable adequate control of an operation for water-cooling the copper crucible, and so forth are conceivable. However, a finely controlled operation cannot necessarily be executed with ease owing to latent problems such as constraints from the viewpoint of a water-cooling structure of the copper crucible, constraints from the viewpoint of safety of the copper crucible, and so forth.

In Patent Document 4 described hereunder, there is disclosed a crucible structure devised in such a way as to enable induction-melting to be effected in a cooled state higher in temperature than the water-cooled copper crucible. More specifically, there is adopted a structure wherein a plurality of cooling pipes are disposed inside the wall of a heat-resistant crucible made of alumina, or magnesia, the outer periphery of the crucible is covered with an electrically conductive airtight sealing cylinder, and an induction coil is disposed on the outer periphery thereof. Further, in another Patent Document 5, it is described that refractory ceramic coating of yttrium oxide, and so forth is applied to the inner wall of a crucible of an induction-melting apparatus, thereby executing the so-called cold crucible levitation melting.

After all, with a method whereby the cold-crucible melting method is combined with flux refining, problems remain in that there occur not only deterioration in the refining effect itself, attributable to a drop in temperature of the refining flux due to a cooling action, but also deterioration in the power efficiency, due to a large amount of heat transfer from the molten metal. Further, with the heat-resistant crucible provided with the cooling pipes, disclosed in Patent Document 4, a halide-base flux will react with the refractories of the crucible, so that it is difficult to make use of refining using flux. A method for applying mold wash of refractory ceramics to the crucible, as disclosed in Patent Document 5, is not suitable for use when applying mold wash with a refining flux having high refining performance at a low melting point.

Further, the invention relates to a method for melting ultrahigh-purity alloying materials for Fe-base, Ni-base, and Co-base alloys, respectively, as represented by stainless steel, and various superalloys.

As requirement quality is more diversified, or becomes higher in grade, it is a major problem emerging upon melting of an ultrahigh-purity alloying material such as a Fe-base, an Ni-base, or a Co-base alloying material that impurity elements such as oxygen (O), nitrogen (N), sulfur (S), phosphorus (P), and so forth need be comprehensively reduced to the utmost limit.

A conventional mass production low carbon stainless steel is produced through a process of electric furnace—AOD (VOD)—ladle refining, and so forth, and a normal level of those C+O+N+S+P base impurity elements is on the order of 400 ppm, the reduction limit thereof being considered around 250 ppm.

In contrast, as a method for producing a ultrahigh-purity stainless steel, and an Ni-base superalloy, there is a well known method for executing melting in two stages, whereby a vacuum induction melting method is applied in primary melting, and a vacuum arc melting method, an eletro-slag melting method, or an electron-beam melting method, and so forth are applied in secondary melting. It is known that if a ultrahigh-purity and high Cr—Ni austenite stainless steel is produced by the vacuum induction melting method (the primary melting), and the electron-beam melting method (the secondary melting), the level of those C+O+N+S+P base impurity elements can be lowered to on the order of 100 to 150 ppm.

However, in the case where very high corrosion resistance is required as is the case with the latest equipment intended for a nuclear power plant, supply of an ultrahigh-purity alloying material is required, and there is a demand for a new technology capable of further reducing levels of impurities such as S, P, and so forth. In the case of producing this kind of alloying material containing various alloy constituents, many impurity constituents are generally brought in from alloy raw materials to be added. In particular, various raw materials as supply sources of Cr, Mn, and so forth, in heavy use as the alloy raw materials, contain much of impurity elements such as S, P, C, O, N, and so forth. A representative raw material for electrolytic chromium contains C: 130 ppm, O: 440 ppm, N: 45 ppm, P: 10 ppm, and S: about 26 pm and raw material for electrolytic manganese contains C: 40 ppm, O: 1600 ppm, N: 50 ppm, P: 10 ppm, and S: about 260 pm. Accordingly, even if use is made of a high-purity raw material for iron (electrolytic iron), and a high-purity raw material for Ni (electrolytic nickel), in order to melt those alloy raw materials, containing Cr, Mn, and so forth, in large amounts, it is necessary to effectively remove those impurity elements such as S, P, C, O, N, and so forth out of a molten metal as adjusted to match alloy composition by refining.

Now, the vacuum induction melting method often adopted as a method in the primary melting is an excellent melting method whereby alloying elements are melted due to an effect of a molten metal being stirred by the agency of an electromagnetic force following induction heating from a coil to thereby enable constituent adjustment to be easily effected so as to match a predetermined alloy composition. However, since in most cases, use is made of a melting vessel made of refractories based on oxides such as magnesia, alumina, and so forth, there is a risk in principle that oxygen is supplied from those refractories to a molten metal, so that there are limitations to oxygen removal.

Meanwhile, use of a halide-base refining flux such as calcium fluoride, calcium chloride, and so forth, in large amounts, is normally effective in removing impurities such as S, P, and so forth, that is, effecting desulfurization, and dephosphorization, against the molten metal. However, because halide-base refining agents will cause a crucible made of the oxide-base refractories to undergo intense melt-damage, use of this kind of refining flux is almost impossible in reality. Accordingly, with the current state of the art, high-purity raw materials must be used as melting raw materials in many cases when the vacuum induction melting method is adopted.

In contrast, the cold-crucible induction melting method often applied to melting of alloying materials that are quite active at a high temperature, such as Ti, Zr, and so forth, is characterized in that the water-cooled copper crucible is used in place of the crucible made of refractories. The method is advantageous in carrying out refining in a reducing atmosphere because Ca—CaF$_2$ is used for a refining flux as a method for removal of S, and P, contained in stainless steel. The reason for that is because the refining flux such as Ca—CaF$_2$, and so forth is harmless to the water-cooled copper crucible although the same will cause considerable damage on the crucible made of oxide-base refractories at a melting temperature.

In the following Patent Documents 1 to 3, and 6, 7, it is described that with this kind of method, P in a molten metal can be reduced to not higher than 5 ppm. Patent Documents 3, 6, and 7 describe a series of inventions based on the basic principle that use of flux is combined with cold-crucible type suspension melting to thereby cause oxide inclusions to migrate into the flux so as to be separated. Further, in Patent Document 2, it is described that when an extremely low P containing stainless steel is produced by the cold-crucible induction melting method, a Ca—CaF$_2$ base refining flux is caused to be interjacent between hot metal and the water-cooled copper crucible, thereby causing P in the steel to migrate into the Ca—CaF$_2$ flux.

Further, it is also known that if Ca out of Ca—CaF$_2$, and so forth, for use in the refining flux for production of stainless steel, is mixed in the stainless steel, this will cause Ca ranging from several tens of ppm to several hundred ppm to remain in the stainless steel, thereby considerably deteriorating corrosion resistance thereof. In the following Patent Document 1, there is disclosed a method whereby an alloying material is first dephosphorized with a Ca—CaF$_2$ base flux, to be treated again with a CaF$_2$ flux, thereby reducing Ca content of an alloy to not more than 30 ppm, however, with this two-stage method, reaction efficiency is not so good as expected.

As a method for melting high-purity high-grade alloying materials by the cold-crucible induction melting method, the known basic methods for effecting dephosphorization, and decalcification by use of the Ca or CaF$_2$ base flux as a refining agent have been introduced as above. Those methods certainly seem to be good methods in terms of dephosphorization, or decalcification, however, those methods are not considered satisfactory from the viewpoint of an object for comprehensively reduce, and remove a series of impurities, including C, O, N, S, P, and Ca, to the limits, as expected by the invention.

Further, besides the cold-crucible induction melting method described as above, the electron-beam melting method, and a vacuum melting method whereby the vacuum arc melting method using the water-cooled copper crucible is adopted have been in widespread use, however, any of those methods are intended for removal of specific elements, and non-metal inclusions, having not reached as yet a mature state for comprehensively reducing impurities such as C, O, N, S, P, Ca, and so forth.

Patent Document 1: JP-A No. 2003-55744
Patent Document 2: JP-A No. 2002-69589
Patent Document 3: JP-A No. 2000-248310
Patent Document 4: JP-A No. 2003-227687
Patent Document 5: JP-A No. 5 (1993)-322451
Patent Document 6: JP-A No. 11 (1999)-246919
Patent Document 7: JP-A No. 11 (1999)-246910

DISCLOSURE OF THE INVENTION

The present invention relates to an induction-melting apparatus intended to exhibit high refining performance without inflicting damage to a crucible even if a halide-compound base refining flux is used upon induction-melting of an ultrahigh-purity high melting point alloying material for a Fe-base alloy, an Ni-base alloy, a Co-base alloy, or a multiple components base alloy, having a melting point reaching 1500° C., and to enable a large amount of the halide-compound base refining flux to be used without causing concurrent deterioration in power efficiency, and a method for induction-melting using the same.

Further, the present invention is intended to provide a melting method for enabling production of ultrahigh-purity Fe-base, Ni-base, and Co-base alloying materials, each having an impurity level of (C+O+N+S+P)<100 ppm, and Ca<10 ppm, for stainless steel in a large ingot, various superalloys, and so forth.

In order to solve those problems, the invention provides:
(1) An induction-melting apparatus using a halide-base crucible incorporating a segment type crucible comprising a peripheral body part made up of a plurality of tubular segments disposed so as to be cylindrical in shape, each of the tubular segments being capable of distributing a cooling agent therein, and an induction coil wound around on an outer side of the peripheral body, wherein a gap in a range of 1.5 to 15 mm in distance is provided between the respective tubular segments adjacent to each other, and a solid halide layer composed of any substance selected from the group consisting of single chemical elements of halides of metal elements of the Groups IA, IIA, IIIA, IVA or IIIB, and IVB of the Periodic Table of the Elements, or from mixtures of the halides, oxides, and carbides, or nitrides of the metal elements, is formed in each of the gaps, and on an inner peripheral surface of the peripheral body part, (2) A method for manufacturing a halide-base crucible for induction-melting, comprising the steps of disposing a plurality of tubular segments so as to be cylindrical in shape, and to maintain a gap in a range of 1.5 to 15 mm in distance between the respective tubular segments adjacent to each other, thereby making up a peripheral body part of the crucible, inserting a graphite cylinder into the peripheral body part such that space is maintained between an outer peripheral surface of the graphite cylinder, and inner peripheral surface of the peripheral body part, charging powders of any substance selected from the group consisting of single chemical elements of halides of metal elements of the Groups IA, IIA, IIIA, IVA or IIIB, and IVB of the Periodic Table of the Elements, or from mixtures of the halides, oxides, and carbides, or nitrides of the metal elements, into the space, subsequently activating an induction coil disposed on an outer side of the crucible to heat the graphite cylinder, thereby causing the powders to infiltrate into the respective gaps while turning the powders in a molten state, additionally charging the powders so as to be molten to thereby fill up the space between the peripheral body part of the crucible and the graphite cylinder, and stopping heating with the induction coil to gradually cool the crucible in whole to thereby form a solid halide layer in each of the gaps, provided between the respective tubular segments adjacent to each other, and on the inner peripheral surface of the peripheral body part of the crucible before removing the graphite cylinder, and (3) A method for induction-melting, using the halide-base crucible as set forth under an item (1) as above, comprising the steps of continuously guiding a cooling agent into the respective tubular segments of the crucible to forcibly cool the crucible, and concurrently charging predetermined alloy constituents, and a refining flux into the crucible to thereby refine an alloy with the flux.

In order to solve the problems described as above, the invention further provides:

(4) A method for melting ultrahigh-purity Fe-base, Ni-base, and Co-base alloying materials, said method comprising the step of melting a high-purity main raw material and alloying raw materials, refined in an inert gas atmosphere by a cold-crucible vacuum induction-melting method, using a water-cooled copper crucible, subsequently adding a refining flux composed of any selected from the group consisting of metal elements of the Groups IA, IIA, or IIIA of the Periodic Table of the Elements, oxides thereof, halides thereof, halide single elements or halides selected from the group of halides, or mixtures of the metal elements, and the oxides thereof to be thereby turned into a molten state, executing primary melting by holding a state of a molten metal being in contact with the refining flux for not less than 5 minutes before tapping, causing the molten metal to undergo solidification inside a mold, thereby producing a primary ingot, and subsequently executing secondary melting by an electron-beam melting method, wherein while the primary ingot is sequentially melted in a water-cooled copper mold at an atmospheric pressure not higher than 0.5 Pa, the molten metal as-solidified state is pulled out from an outlet side of the water-cooled copper mold, thereby forming an ingot product, and (5) The method for melting ultrahigh-purity Fe-base, Ni-base, and Co-base alloying materials, as set forth under an item (4) as above, wherein ultrahigh-purity Fe-base, Ni-base, and Co-base alloying materials, each containing not less than 8 wt % of Cr and Mn, total concentration of carbon (C), nitrogen (N), oxygen (O), sulfur (S), and phosphorus (P), as impurities, not higher than 100 ppm, and total concentration of respective metals of the Groups IA, and IIA of the Periodic Table of the Element, not higher than 10 ppm, are melted.

EFFECT OF THE INVENTION

As described in the foregoing, with the present invention, the crucible having a forcible cooling function by the action of the tubular segments is incorporated in the induction-melting apparatus, and a halide, that is, a solid halide layer is provided between the respective tubular segments adjacent to each other. Furthermore, since the same solid halide layer is formed on the inner peripheral surface of the peripheral body part of the crucible as well, high refining performance can be safely maintained even if use is made of the halide-base flux as a refining agent, and induction-melting of ultrahigh-purity alloys can be concurrently effected without causing deterioration in power efficiency. In addition, not only a sufficient amount of the halide-base refining flux can be used to thereby raise a refining degree but also an application range of the induction-melting can be further expanded. Further, even in the event that the halide layer of the peripheral body part is partially broken by a molten alloy bath at a high temperature, allowing otherwise infiltration of the molten metal, it is possible to cause the molten metal to undergo cooling and solidification by virtue of the forcible cooling function of the crucible, thereby preemptively preventing the induction coil disposed on the outer side from being damaged.

As described in the foregoing, the present invention also provides the method for melting the ultrahigh-purity alloying materials, having a basic feature in that the primary melting by use of the cold-crucible type vacuum induction melting method, executed in combination with the use of the halide-base flux, is combined with the secondary melting by use of the electron-beam melting method. In the primary melting, the molten metal is held in contact with the halide-base refining flux in the water-cooled crucible for not less than 5 minutes. The method for melting the ultrahigh-purity alloying materials has an important feature in that a primary refining reaction sufficiently proceeds by so doing, and in the secondary melting, the primary ingot is melted in a atmosphere at a low pressure not higher than 0.5 Pa, thereby promoting secondary refining due to evaporation of impurity metals. With this method, it has become possible to produce high-purity Fe-base, Ni-base, and Co-base alloys, each containing less than 8 wt % of Cr and Mn, large in ingot size, that is, each having a reduced impurity level of (C+O+N+S+P)<100 ppm, (C+O+N+S+P)<50 ppm, and Ca<10 ppm, which used to be industrially difficult to produce by the conventional method, so that metal materials excellent in corrosion resistance can be provided.

EXPLANATION OF REFERENCE NUMERALS

1: tubular segments
2: gap between the tubular segments
3, 4: solid halide layers
5: graphite cylinder

BEST MODE FOR CARRYING OUT THE INVENTION

Figure 1:
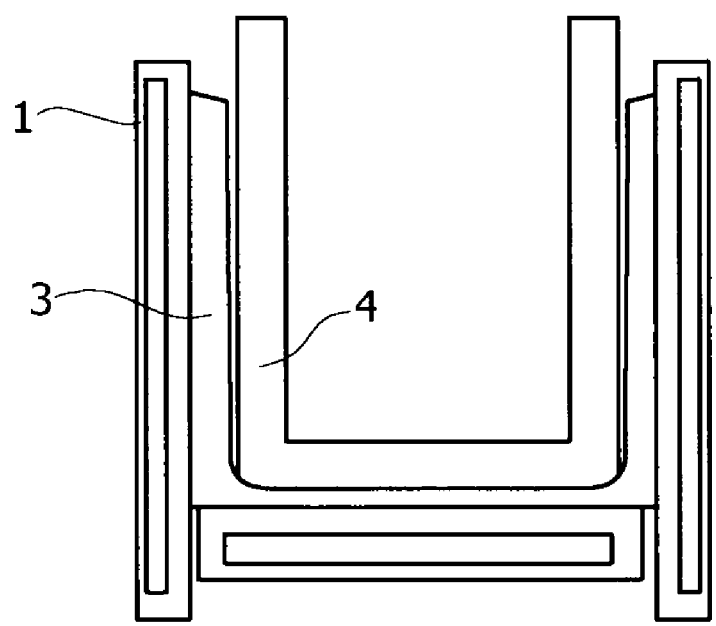
FIG. 1 shows both longitudinal and cross sections of a halide crucible of an induction-melting apparatus according to the invention.
Figure 1:
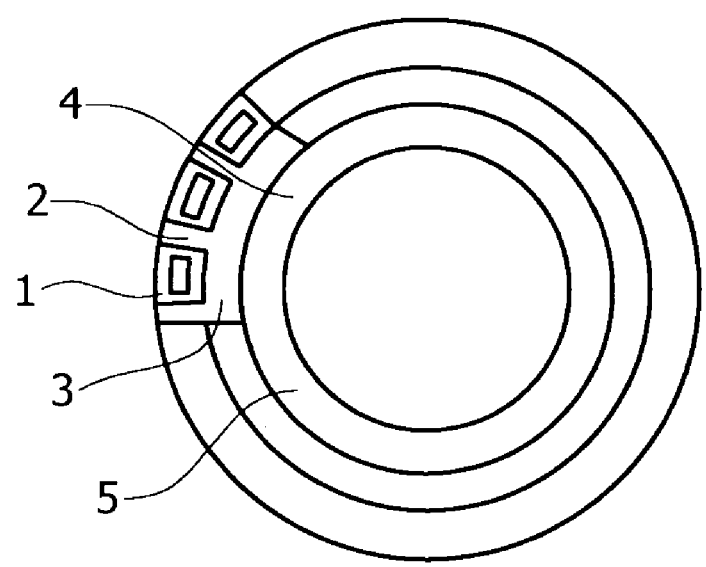

FIG. 1 shows a structure of a preferred embodiment of an induction-melting apparatus according to the invention. With the present invention, a crucible having a cooling function is adopted, and as in the case of a known crucible, tubular segments 1 made of copper, formed so as to be circular or square in cross section, are combined together in the form of a cylinder, thereby making up a peripheral body part of the apparatus. In this case, a gap 2 in a range of 1.5 to 15 mm in distance is provided between the respective tubular segments 1, adjacent to each other. A mica board is wound around on the external side of the peripheral body part, adjacent to an induction coil (not shown), and the mica board is secured by winding the same with a temperature-resistant tape.

Solid halide layers 3, 4 are formed on an inner side of each of the gaps 2, provided between the respective tubular segments 1, and on an inner side of the peripheral body part, respectively. A halide-base substance to be used is selected from the group consisting of single chemical elements of halides of metal elements of the Groups IA, IIA, IIIA, IVA or IIIB, and IVB of the Periodic Table of the Elements, or from mixtures of the halides, oxides, and carbides, or nitrides of the metal elements according to a metal alloy as a subject for melting.

To form the halide layers 3, and 4, a graphite cylinder 5 about 10 mm smaller in diameter than the peripheral body part is inserted therein beforehand so as to be concentrically disposed and secured. Then, a halide-base substance of a predetermined composition, separately prepared, kept in powdery state, is filled between the peripheral body part, and the graphite cylinder. Further, the graphite cylinder 5 is subjected to induction-heating by energizing the induction coil disposed on the outer side, and the halide-base substance, in the powdery state, is caused to undergo melting at a temperature higher than a melting point thereof, thereby causing the halide-base substance to flow into each of the gaps 2, between the respective tubular segments 1. After checking completion of sufficient inflow of the halide-base substance, the same kind of halide-base substance, in a powdery state, is additionally charged therein so as to be turned into a molten state, thereby filling up space between the peripheral body part, and the graphite cylinder. By stopping energization of the coil at this point in time, and gradually cooling the apparatus in whole, the solid halide layers 3, 4 are formed on the inner side of each of the gaps 2, provided between the respective tubular segments 1, and on the inner side of the peripheral body part, respectively, whereupon the graphite cylinder 5 having served its purpose is removed. In order to facilitate such a removal work, the outer peripheral surface of the graphite cylinder 5 is preferably formed in the shape of a cone having a slight gradient.

Further, since the mica board, and the temperature-resistant tape are wound around the peripheral body part in order to prevent the halide-base substance when melted from leaking out of the peripheral body part through the respective gaps 2 between the tubular segments 1, the mica board, and the temperature-resistant tape can be removed after having served their purposes.

With the induction-melting apparatus made up as described in the foregoing, each of the gaps 2, provided between the respective tubular segments 1 is filed up with the solid halide layer 3, and an inner peripheral surface of the peripheral body part is completely covered with the solid halide layer 4, so that the induction-melting apparatus as a whole is a halide base crucible. Accordingly, when the induction-melting apparatus is used, by feeding a cooling agent such as water, oil, or a gas into the respective tubular segments 1 of the peripheral body part, it is possible to forcibly cool the crucible in whole down to an optional temperature. In particular, an advantage gained from capability of freely controlling a cooling temperature of the solid halide layers is quite significant in the case of carrying out induction-melting.

The halide-base substance of which the halide layers 3, 4 are each composed has a relatively high melting point, but there are available numerous kinds of halide-base substances, and a melting point level thereof can be selected within a wide range according to a melting temperature at which a high grade alloy is refined by melting in the crucible.

In general, if a crucible itself is made up of a halide-base substance, for example, calcium fluoride, there is a risk that not only the crucible will become more prone to cracking than the crucible made of the oxide-base refractories but also the calcium fluoride will be sintered up to the interior thereof by the agency of high heat of a molten metal, so that once the crucible undergoes cracking, permeation of the molten metal occurs toward the back of the crucible. In contrast, with the induction-melting apparatus according to the present invention, even if the crucible is partially broken owing to a thermal reason, the molten metal will undergo solidification due to the cooling action of the tubular segments of the crucible, so that there is little risk of the induction coil being damaged.

As is evident from the description as above, with the induction-melting apparatus according to the present invention, the inner peripheral surface of the crucible is covered with the halide layers as solidified. In addition, because the halide layers themselves can be forcibly cooled, the apparatus can be used for melting of high-grade alloying materials, accompanied by a large amount of the halide-base refining flux without causing deterioration in refining effect and power efficiency.

Now, the present invention is characterized in that the gap 2 between the respective tubular segments 1, adjacent to each other, is adjusted to fall in the range of 1.5 to 15 mm in distance. There were conducted tests on formation of a halide layer made of calcium fluoride, wherein tubular segments leach are designed to be 30 mm in cross-section thickness (depth dimension in the radial direction of the peripheral body part), and a gap between the respective tubular segments 1 is varied so as to provide seven different cases of a gap being 0.5 mm, mm, 1.5 mm, 2 mm, 10 mm, 15 mm, and 20 mm, respectively, and results of the tests are shown hereunder.

(A) Case of the Gap being 0.5 mm:
Molten calcium fluoride hardly penetrated the gap, easily undergoing exfoliation.

(B) Case of the Gap being 1 mm:
Molten calcium fluoride slightly penetrated the gap, but a solidified calcium fluoride layer was prone to exfoliate.

(C) Cases of the Gap Being 1.5 mm, and 2 mm, Respectively:
Molten calcium fluoride sufficiently penetrated the gap to be then solidified before reaching the outer periphery of a peripheral body part, enabling a structure for supporting a calcium fluoride layer on the inner surface of the peripheral body part to be secured.

(D) Case of the Gap being 20 mm:

It has been found out that a calcium fluoride layer inside the gap was found excessively large in thickness when stainless steel (SUS 304) was actually melted, and a cooling action became insufficient, thereby causing the calcium fluoride layer prone to be easily consumed. Further, in the case of the gap being 15 mm, none of those problems were encountered.

For those reasons described as above, with the present invention, the gap between the respective tubular segments was set to fall in a range of 1.5 to 15 mm. Further, a thickness of the halide layer on the inner surface of the peripheral body part can be freely determined according to a melting condition of an alloy by designing an outside diameter of the cylinder of the peripheral body part, that is, an interval between the halide layer, and the peripheral body part.

As a halide-base substance, calcium fluoride cited as above, having a high melting point, is easy to use, however, with an apparatus for melting a copper alloy having a low melting point, a halide-base substance having a low melting point, such as sodium chloride, and calcium chloride, is suitably used. Besides, a thermodynamically stable compound, such as sodium fluoride, magnesium fluoride, potassium fluoride, magnesium chloride, and rare earth fluoride, or rare earth chloride, can be used. Furthermore, as an oxide, a carbide, or a nitride of a halide-base substance, use can be made of a mixture of, for example, calcium oxide (CaO), magnesium oxide (MgO), yttrium oxide ($Y_2O_3$), titanium carbide (TiC), boron carbide ($B_4C$), silicon carbide (SiC), and so forth.

With the use of the induction-melting apparatus described in the foregoing, it is possible to effect induction-melting of various alloys in a predetermined atmosphere by adding a halide-base refining agent while forcibly cooling the crucible in whole through continuous feeding a cooling agent into the tubular segments of the crucible. With this method, since the surface of the inner side of the crucible is covered with the halide layer, and the solid halide layer identical thereto is tightly filled up in the interval between the respective tubular segments, adjacent to each other, the induction-melting apparatus can function, in effect, as one having a material makeup equivalent to that of a crucible made of a solid halide. Furthermore, since this halide-base crucible is continuously subjected to forcible cooling, a safe operation is ensured without the risk of the halide layer being sintered by the agency of high heat of a molten metal in the middle of induction-melting, resulting in infiltration of the molten metal. In case a portion of the halide layer is thermally damaged, the molten metal otherwise possibly leaking therethrough will tend to be solidified due to the cooling action of the tubular segments, so that the molten metal is blocked from reaching the induction coil on the outside, thereby protecting induction coil from burnout.

In consequence, with the present invention, it is possible to melt a Fe-base alloy, and so forth, to be refined by use of a large amount of a calcium fluoride base compound at a high efficiency which was hardly possible to attain in the past, thereby melting a high-purity alloying material and further, even use of a metallic calcium refining agent, in combination with melting, becomes possible, so that an application range of induction-melting will be rendered wider.

WORKING EXAMPLE

A peripheral body part of a crucible, φ 210 mm in inside diameter, and φ 270 mm in outside diameter was assembled by use of 24 lengths of tubular segments, a mica board and a temperature-resistant tape were wound around the peripheral body part to thereby secure the whole, and an induction coil is attached to the outer periphery thereof. Subsequently, a graphite cylinder 190 mm in outside diameter, and 30 mm in wall thickness was placed on the inner side of the peripheral body part, and calcium fluoride powders were charged in-between the peripheral body part, and the graphite cylinder. Then, with the use of a high-frequency power supply with the max. output of 400 kW at 3 kHz in frequency, an output of the induction coil was gradually increased from 60 kW→100 kW→200 kW to cause the graphite cylinder to evolve heat, thereby turning the calcium fluoride powders into a molten state. As a result of such an operation, a volume of calcium fluoride underwent gradual decrease, so that calcium fluoride powders were additionally fed, and upon a molten layer thereof having reached the upper end of the peripheral body part, a high-frequency power output was gradually lowered, whereupon as the peripheral body part was cooled, so molten calcium fluoride solidified. Upon removal of the graphite cylinder after complete solidification of the molten calcium fluoride, there formed a crucible wherein a solid calcium fluoride layer formed between the respective tubular segments, adjacent to each other, and on the inner side of the peripheral body part, respectively.

Further, a gap between the respective tubular segments, adjacent to each other, is designed to be in the range of 1.5 to 15 mm in distance, as previously described.

The Fe-base, Ni-base, and Co-base alloys, as the targets of the present invention, are alloys composed mainly of Fe, Ni, and Co, respectively, and the most typical material thereof is a highly corrosion resistant stainless steel. Further, "ultra-high-purity" means that respective contents of impurity elements, such as C, O, N, S, P, and so forth, are extremely low in total as compared with the case of an ingot of the same kind of alloy already in widespread use today. With the present invention, an alloying material is refined through melting in the following two stages.

(Primary Melting)

In this process, the vacuum induction melting method according to the cold-crucible system using the water-cooled copper crucible is adopted, and primary melting is executed by adding a halide-base flux for refining such as desulfurization, and dephosphorization to a main raw material and alloying raw materials, pre-melted in an inert gas atmosphere. In the primary melting, by charging the main raw material first to be subjected to vacuum melting, C and O can be removed as CO gas, concurrently removing N as well. Thereafter, an alloying raw material having predetermined constituents is added thereto, thereby adjusting a molten metal to have a predetermined alloy composition.

Incidentally, when producing stainless steel by refining, alloying raw materials such as Fe—Cr, metallic Cr, and so forth, to be added as alloy constituents, contain impurity elements such as S, P, O, N, or C, and so forth, in relatively large amounts. Accordingly, even if a high-purity electrolytic iron is used as a Fe raw material, an impurity amount in an alloy as a whole will increase owing to those impurities accompanying the alloying raw materials. For this reason, in the primary melting, the halide-base flux for refining is added to a molten alloy bath to thereby remove impurity elements.

With the present invention, metals of the Groups IA, IIA, or IIIA of the Periodic Table of the Elements are selectively used as a refining flux. More specifically, selective use is made of Li, Na, K, Mg, Ca, Y, or rare earth elements, and so forth, oxides thereof, that is, $LiO_2$, $Na_2O$, $K_2O$, MgO, CaO, $Y_2O_3$, or misch metal oxides, rare earth oxides, or halides thereof, that is, $CaF_2$, $MgF_2$, $CaCl_2$, NaF, LiF, KF, $YF_3$, or rare earth chlorides, and so forth. In making such as election, a refining flux optimum for refining an ultrahigh-purity metal as a target is prepared for use by selecting any from the group consisting of single elements of the halides described as above or mixtures of the halides, the metal elements, and the oxides thereof.

In the primary melting of the invention, there is adopted the vacuum induction-melting method according to the cold-crucible system using the water-cooled copper crucible without use of a crucible made of refractories, so that it is possible to control the temperature of a water-cooled copper member of the crucible to not higher than 200° C. Accordingly, upon the refining flux such as molten $CaF_2$, and so forth, coming into contact with the crucible, the refining flux itself will undergo solidification hardening, whereupon a solid flux layer is formed on the surface of the water-cooled copper crucible to thereby protect the crucible. Furthermore, a molten flux layer is stably held on the inner side of the solid flux layer, and refining of the molten metal, such as desulfurization, dephosphorization, and so forth, is stably executed. Accordingly, if use is made of, for example, a $CaF_2$ ($CaCl_2$)—CaO base combination flux, desulfurization effects can be expected, or if use is made of a $CaF_2$—Ca base flux as described in Patent Document 5, not only the desulfurization effects but also dephosphorization effects can be expected.

For the primary melting of a high-purity alloying material, the vacuum induction-melting method using the crucible formed of the refractories made of magnesia or alumina is in widespread use, however, if a halide flux base refining agent in a large amount is used for the purpose of desulfurization and dephosphorization, this will cause compounds thereof to easily react with the refractories of the crucible, thereby inflicting melt-damage thereon. With the primary melting according to the invention, however, there is adopted the cold-crucible type induction-melting method using the water-cooled copper crucible, so that it is possible to safely use a sufficient amount of a halide-base refining flux without such constraints as described.

In the primary melting, a state in which the molten alloy bath, and the refining flux, in the water-cooled copper crucible, are in contact with each other is held for 5 minutes or longer, and subsequently, tapping is executed to cause the molten alloy bath to be solidified in a mold, thereby producing a primary ingot. In order to gain satisfactory effects of refining, there is naturally the necessity for keeping a molten metal in sufficient contact with the refining flux, and from the viewpoint of a refining reaction rate, it is necessary to keep the refining flux being held in contact with the molten metal for at least 5 minutes, preferably 15 minutes or longer.

The molten alloy bath having undergone constituent adjustment, and refining with the flux, described as above, is poured into the mold by an operation such as tilting of the crucible, and so forth, thereby forming the primary ingot in a bar-like shape.

(Secondary Melting)

If the halide-base refining flux is used in the primary melting as described above, impurity elements such as S, P, and so forth can be removed, but, on the other hand, there is a risk that Ca, Mg, and so forth, at a content level ranging from several tens of ppm to several hundred ppm, will migrate into the molten metal to be trapped therein. With the present invention, since Ca causes an alloying material susceptible to corrosion, residual Ca, and Mg are removed in the secondary melting.

In a process step of the secondary melting, the electron-beam melting method, preferably a water-cooled hearth type electron-beam melting method is adopted, and the primary ingot in the bar-like shape as a melting raw material is fed to the inlet side of a water-cooled hearth so as to be melted. Subsequently, a molten alloy bath resulted from melting is caused to flow over the hearth so as to outflow from the outlet side thereof into a water-cooled copper mold to be gradually pulled out while being solidified from below, thereby being turned into a long ingot product.

Upon execution of the electron-beam melting, it is necessary to execute melting at a low vacuum pressure not higher than 0.5 Pa, thereby ensuring a high refining effect for sufficiently evaporating and removing Ca, Mg, and so forth, in trace amounts, remaining in the molten metal. In this process step, it is possible to lower Ca concentration, and Mg concentration down to not higher than 10 ppm, respectively. Furthermore, the electron-beam melting is capable of not only concurrently causing oxide-base inclusions to undergo floatation separation to thereby reduce O concentration as a whole but also effectively removing N as well.

Further, with the electron-beam melting, there is a tendency that metal elements among alloy constituents, relatively high in vapor pressure, such as Cr, Mn, and so forth, in particular, will undergo contingent volatilization and removal, and if such vaporization irregularly occurs, this will cause the ingot prone to contain those metal elements varying in concentration along the direction of height thereof. Accordingly, it is preferable to execute melting and casting with a melting rate and an ingot pullout rate, in as controlled-state so as to be constant, and to set concentration of those metal elements in the primary ingot to a slightly higher side by estimating respective removal amounts of Cr, and Mn, due to vaporization.

If the melting in the two stages is executed as described in the foregoing, it is possible to easily produce respective alloying materials for ultrahigh-purity Fe-base, Ni-base, and Co-base metals, characterized in that total content of C, N, O, S, and P as impurity elements in the alloying material is not higher than 100 ppm, and total concentration of metals of the Groups IA, and IIA, respectively, coming from the refining flux, is not higher than 10 ppm. In reality, with a type of alloying material containing not less than 8 wt % of Cr+Mn as alloy constituents, a total amount of C, N, O, S, and P, brought in from Cr and Mn raw materials in use, is very large, so that it is not easy to produce ultrahigh-purity materials. However, with the present invention, such a problem can be easily overcome.

WORKING EXAMPLE

In the case of this working example, the primary melting was executed with the use of a cold-crucible induction-melting apparatus of the following facility specification, provided with a vacuum chamber, thereby melting 50 kg of stainless steel (SUS316L) for refining. With respect to each of comparative examples, there was conducted a melting test on the same variety of stainless steel as a target.

Max. Output: 400 kW
Power supply frequency: 3 kHz
Water-cooled copper crucible: inside dia.; $\phi$210 mm, the number of segments; 24 pieces (slit interval; 0.5 mm)
Melting capacity: stainless steel 40 to 50 kg/heat (Primary Melting)

First, electrolytic iron was charged into the water-cooled copper crucible of the cold-crucible induction-melting apparatus to be subjected to induction melting in a vacuum. In this process step, there was observed a state of molten metal frothing up as a result of oxygen in the electrolytic iron coming to react with charged carbon, and if excessive heat is rapidly applied at this point in time, this will cause bumping, thereby blowing off the molten metal, an operation was therefore controlled so as to cause melting to gradually proceed. Then, after formation of a molten pool within the copper crucible, vacuum pumping was executed until pressure was down to 10 Pa or lower, degassing treatment was applied for not less than 15 minutes, and subsequently, argon gas was fed into the vacuum chamber, thereby rendering an atmospheric pressure to be at 53 kPa (400 Torr).

Subsequently, an electrolytic nickel raw material was added to the molten metal in the water-cooled copper crucible, followed by addition of an electrolytic chromium raw material, and a molybdenum briquette raw material, respectively, thereto, whereupon the molten metal was held for 30 minutes, thereby implementing alloying by completely melting those raw materials. Thereafter, silicon and an electrolytic manganese raw material were added thereto to be held for 15 minutes. In this stage, a state of Si oxide and Mn oxide undergoing floatation was observed.

Next, by charging 1 kg (corresponding to 2% of an amount of the molten metal) of calcium fluoride powders onto the molten metal to be thereby molten by the agency of heat of the molten metal, it was observed that molten calcium fluoride flows in between the copper crucible, and a molten alloy bath pool, and a solid $CaF_2$ layer was concurrently formed on the surface layer of the copper crucible. Thereafter, 500 g (corresponding to 1% of the amount of the molten metal) of a mixture of metallic calcium-calcium fluoride (1:1) was further added thereto, and a molten metal was held for four different time periods of 5, 10, 20, and 30 minutes, respectively, as shown in Table 1. Subsequently, the crucible in whole was tilted to pour the molten metal present in the crucible into the mold, thereby casting an ingot in the shape of a bar $\phi 100$ mm×700 L mm. Further, in this case, a molten metal temperature during molten metal holding time is as shown in Table 1.

(Secondary Melting)

Next, the secondary melting was executed by use of an electron-beam melting furnace. The electron-beam melting furnace is provided with one unit of an electron gun having an accelerating voltage at the max. output of 80 kW, having a makeup wherein a water-cooled copper mold 150 mm in inside diameter, an ingot pullout mechanism, and a raw material feeding mechanism for feeding a bar-like raw material onto the mold are attached to a vacuum chamber. The interior of the vacuum chamber was subjected to vacuum pumping with two units of diffusion pumps each with capacity of 8000 L/s, and use was made of a facility capable of vacuum pumping to a level of $10^{-6}$ Torr in degree of vacuum.

The primary ingot in the shape of the bar $\phi 100$ mm×700 L mm, produced by the primary melting, was mounted on the raw material feeding mechanism of the electron-beam melting furnace to be then delivered as far as over the mold $\phi 150$ mm in size, whereupon the tip, and a portion thereof, corresponding to a molten metal within the mold are irradiated with an electron beam at an output of 60 kW, thereby forming a molten metal within the mold. As a result of this operation, the tip of the ingot in the shape of the bar is turned into a molten state, dropping as droplets, so that an ingot formed due to earlier cooling and solidification was pulled out according to a melting rate at 15 kg/hr, thereby producing a product ingot $\phi 100$ mm×300 L mm.

Further, for electron-beam melting, a degree of vacuum is normally at a level of $10^{-4}$ Torr (0.01 to 0.1 Pa), however, with tests according to the present embodiment, in order to curb excessive vaporization of alloying elements such as Cr, Mn, and so forth, the operation was carried out with a degree of vacuum in a range of about $1 \times 10^{-3}$ to $5 \times 10^{-3}$ Torr (0.01 to 0.5 Pa), whereupon it was found out possible to sufficiently vaporize Ca for removal even at the degree of vacuum, described as above. More specifically, the degree of vacuum, and irradiation output of an electron beam were varied in four different cases, respectively, as shown in Table 1.

Meanwhile, as comparative examples against the same variety of steel as a target, two-stage melting was conducted under conditions (refer to Table 1) differing from those for working examples according to the embodiment of the invention.

In Table 2, there are shown concentrations of respective impurity elements of the ingot after the primary melting, and the ingot after the secondary melting with respect to the working examples, and the comparative examples, and it is evident that in the case of respective products according to four varieties of the working examples, having gone through a process of the two-stage melting, not only concentrations of respective impurities of S, P, O, N are generally low in comparison with the comparative examples but also it is possible to produce high-purity stainless steel low in Ca concentration.

In the case of the comparative example 3 in Table 1, because the output of the electron beam was unstable, it was not possible to produce an ingot, and analysis values of impurity constituents are therefore not carried in Table 2.

Further, the stainless steel (SUS316L) ingot as described had the following main composition (in wt %).
C≦0.030, Si≦1.00, Mn≦2.00
Ni: 12.0 to 15.0, Cr: 16.0 to 18.0
Mo: 2.0 to 3.0

TABLE 1

|  | Primary melting (Cold crucible type) | | Secondary melting (Electron-beam melting) | |
| --- | --- | --- | --- | --- |
|  | Molten metal holding time after addition of a refining flux (Min) | Molten metal temperature during the molten metal holding time (° C.) | Degree of vacuum (Pa) | Irradiation output of an electron beam when melted (Average kW) |
| W.E. 1 | 5 | 1500 | 0.4 | 68 |
| W.E. 2 | 10 | 1510 | 0.1 | 67 |
| W.E. 3 | 20 | 1500 | 0.5 | 65 |
| W.E. 4 | 30 | 1500 | 0.3 | 64 |
| C.E. 1 | 20 | 1500 | — | — |
| C.E. 2 | 3 | 1510 | 0.2 | 65 |
| C.E. 3 | 20 | 1510 | 0.7 | 50-70 |

Remarks: W.E. refers to a working example, and C.E. refers to a comparative example.

TABLE 2

| | analysis values of impurity constituents | | | | |
|---|---|---|---|---|---|
| | S | P | O | N | Ca |
| W.E. 1 | 8 | 7 | 8 | 20 | 6 |
| W.E. 2 | 6 | 6 | 7 | 17 | 5 |
| W.E. 3 | 6 | 6 | 8 | 17 | 5 |
| W.E. 4 | 5 | 5 | 5 | 18 | 5 |
| C.E. 1 | 7 | 7 | 10 | 19 | 150 |
| C.E. 2 | 15 | 17 | 15 | 25 | 5 |

Remarks: W.E. refers to a working example, and C.E. refers to a comparative example.

The invention claimed is:

1. A method for producing ultrahigh-purity Fe-base, Ni-base, and Co-base alloying materials, said method comprising:
    (1) melting a high-purity main raw material and an alloying raw material, refined in an inert gas atmosphere by a cold-crucible vacuum induction-melting method, using a water-cooled copper crucible to form a melt;
    (2) subsequently adding a refining flux selected from the group consisting of halides of metal elements, metal elements and oxides of metal elements, which metal elements are selected from the group consisting of metal elements of groups IA, IIA, and IIIA of the Periodic Table, and mixtures thereof, to the melt;
    (3) executing a primary melting by holding the melt in contact with the refining flux for not less than 5 minutes before tapping the primary melt;
    (4) causing the primary melt to undergo solidification inside a mold, thereby producing a primary ingot; and
    (5) subsequently executing a secondary melting by an electron-beam melting method, wherein while the primary ingot is sequentially melted in a water-cooled copper mold at a pressure not higher than 0.5 Pa, the secondary melt in solidified state is pulled out from an outlet side of the water-cooled copper mold, thereby forming an ingot product.

2. The method for producing ultrahigh-purity Fe-base, Ni-base, and Co-base alloying materials, as set forth in claim 1, wherein ultrahigh- purity Fe-base, Ni-base, and Co-base alloying materials, each containing not less than 8 wt % of Cr and Mn, a total concentration of carbon (C), nitrogen (N), oxygen (O), sulfur (S), and phosphorus (P), as impurities, not higher than 100 ppm, and a total concentration of respective metal elements of the Groups IA and IIA of the Periodic Table, not higher than 10 ppm, are melted.

3. The method for producing ultrahigh-purity Fe-base, Ni-base, and Co-base alloying materials, as set forth in claim 1, comprising executing the primary melting by holding the melt in contact with the refining flux for 10 minutes before tapping the primary melt.

4. The method for producing ultrahigh-purity Fe-base, Ni-base, and Co-base alloying materials, as set forth in claim 1, comprising executing the primary melting by holding the melt in contact with the refining flux for at least 15 minutes before tapping the primary melt.

5. The method for producing ultrahigh-purity Fe-base, Ni-base, and Co-base alloying materials, as set forth in claim 1, comprising executing the primary melting by holding the melt in contact with the refining flux for 20 minutes before tapping the primary melt.

6. The method for producing ultrahigh-purity Fe-base, Ni-base, and Co-base alloying materials, as set forth in claim 1, comprising executing the primary melting by holding the melt in contact with the refining flux for 30 minutes before tapping the primary melt.

7. The method for producing ultrahigh-purity Fe-base, Ni-base, and Co-base alloying materials, as set forth in claim 1, comprising executing the secondary melting in an electron beam furnace with an electron-beam at an output of 60 to 80 kW.

8. The method for producing ultrahigh-purity Fe-base, Ni-base, and Co-base alloying materials, as set forth in claim 1, comprising executing the secondary melting in an electron beam furnace with an electron-beam at an output of 64 to 68 kW.

* * * * *